Nov. 20, 1962 M. L. KASBOHM 3,064,441
LOW TEMPERATURE CLEANING OF AN IMPURITY-CONTAINING GAS
Filed Dec. 9, 1958 4 Sheets-Sheet 3

INVENTOR.
MARTIN L. KASBOHM
BY
*William F. Meisinger*
ATTORNEY

INVENTOR.
MARTIN L. KASBOHM

United States Patent Office 3,064,441
Patented Nov. 20, 1962

3,064,441
LOW TEMPERATURE CLEANING OF AN
IMPURITY-CONTAINING GAS
Martin L. Kasbohm, Indianapolis, Ind., assignor to Union
Carbide Corporation, a corporation of New York
Filed Dec. 9, 1958, Ser. No. 779,101
6 Claims. (Cl. 62—12)

This invention relates to an improved process of and apparatus for low temperature cleaning of a low-boiling impurity containing compressed gas, and more particularly to the removal of low boiling impurities from a compressed air stream.

Gases such as atmospheric air often contain substantial quantities of carbon dioxide and other low-boiling impurities, and unless these impurities are removed by chemical treatment or by adsorption, they will deposit as solid impurities on the heat exchange surfaces if the gas is cooled, for example, prior to low-temperature separation into gas components. This causes considerable difficulty because if such deposition is continued, the heat exchange surfaces become coated with thick layers of solid particles thus reducing heat transfer efficiency. Eventually these surfaces will plug up completely, making the gas separation process inoperative. Also, the presence of such impurities in a gas may have an undesirable effect on other processes in which the gas might be used. For example, it has been found that the efficiency of certain metallurgical processes utilizing gaseous hydrogen is substantially improved if the low-boiling impurities are removed from the hydrogen before passage of the latter to the furnace. One solution to this problem is to cool the gas below the dew points of the respective impurities so that the latter deposit on the heat exchanger surfaces, and provide duplicate heat exchangers piped in parallel. Thus, a clogged heat exchanger may be thawed while the cleaned unit is on stream. However, such duplication is an expensive solution because thawing incurs loss of refrigeration in operation and the heat exchangers usually represent a major item of plant investment cost.

In air separation plants employing relatively low air supply pressures, e.g. below about 150 p.s.i.g., most of the low-boiling impurities are removed from the incoming air by the above freeze-out method except for a modification of reversal of passage flows between the air and purge nitrogen or oxygen for continuous cleanup of condensables. The impurities are deposited in the colder section or part of a reversible heat exchange zone by heat exchange with the outgoing air separation components. This zone may comprise heat exchangers of the accumulator or the passage exchanging types. In order to avoid a buildup of low-boiling impurities in such heat exchange zone, the zone must be "self-cleaning." This means that substantially all of the impurities deposited in a reversing passageway during a gas cleanup stroke must be evaporated and swept out during the next succeeding purge gas stroke. The self-cleaning condition may not be achieved by simply passing all of the outgoing product gas through the reversible heat exchange zone because compressed air along with most other gas mixtures, especially at low temperatures, has a substantially greater specific heat than the non-compressed air separation products, e.g. oxygen and nitrogen. This relationship causes excessive temperature differences between gas streams at the cold end of the heat exchange zone, which results in a greater difference between the saturation vapor pressures of the low-boiling impurities, e.g. carbon dioxide, in the inlet gas mixture and their saturation vapor pressures in the purge streams so that the purge gas becomes less capable of re-evaporating all the carbon dioxide deposited from the inlet gas. In order to counteract this tendency and obtain a self-cleaning process, it is common practice to provide a mass of outflowing products which exceeds the inflowing mass at least through the colder portion of the heat exchange zone. This closes the cold end temperature difference between the streams and establishes a temperature difference pattern favorable for evaporation of the impurity deposits. Thus, the impurity carrying capacity of the purge stream is dependent upon its temperature at any level in the cold end of the heat exchange zone, and self-cleaning is favored by bringing the average purge temperature as close to the average gas mixture temperature as practical.

Once a favorable ΔT pattern is established, as for example by air side bleed from the heat exchange zone, the heat exchange zone should be self-cleaning provided that a sufficient amount of outflowing gas is available for purging the reversing passageways. In a conventional air separation process, the nitrogen product e.g. 80% of the air volume, is usually an adequate quantity of purge gas, and the total oxygen product, e.g. 20% of the air, may be readily withdrawn as clean gas through non-reversing passageways without creating a shortage of purge gas. By proper design and operation of a conventional air separation plant, the total proportion of separated gas required for purge may be less than 80%, and a total as low as 50% of the air is attainable. However, when a large amount of clean products such as nitrogen gas is desired, the total available waste gas may be considerably less than 50% and the problem of providing sufficient quantity of purge gas becomes critical. To a limited extent, the problem of recovering increased amounts of clean products may be met by further reducing the heat exchange zone cold end ΔT, as for example, by adding more heat transfer area or by unbalancing the flows to a greater degree. However, such measures are not economical because as previously mentioned, heat exchangers represent an expensive investment and excessive flow unbalance leads to thermodynamic inefficiencies in subsequent steps of the process.

An object of the present invention is to provide an improved process of and apparatus for low temperature cleaning of low-boiling impurity-containing gas.

Another object of the present invention is to provide an improved process of and apparatus for cleaning a gas stream in which less purge gas is required to remove the low-boiling impurities deposited in the reversible heat exchange zone, thereby facilitating a higher recovery of impurity-free product gas.

These and other objects and advantages of this invention will be apparent from the following description and accompanying drawings in which.

In the drawings similar items of apparatus in the several figures are designated by similar reference numerals.

Figure 1:
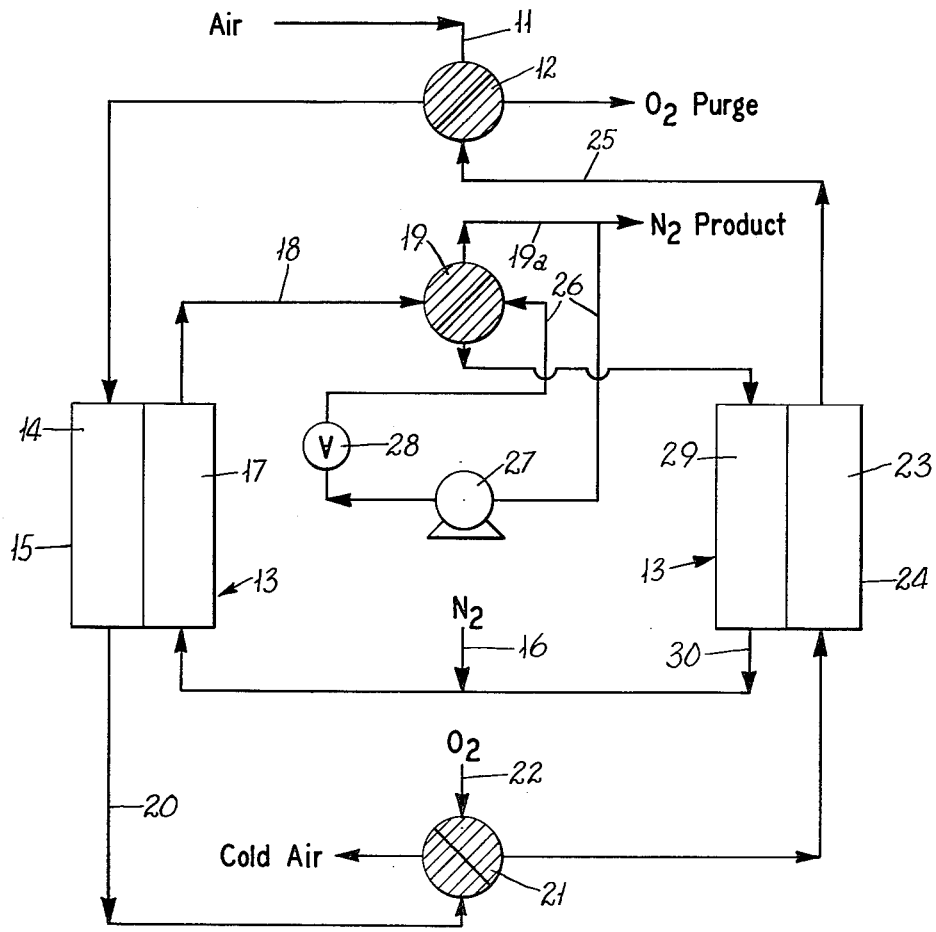
FIG. 1 is a schematic flow diagram of a low-temperature gas mixture cleanup system according to the present invention, in which a pair of two-pass reversing heat exchangers with a variable flow, first fluid recycle system comprises the reversible heat exchange zone.

The present invention is predicated on the principle that the impurity carrying capacity of the purge gas may be increased by slightly warming such gas and that the impurity carrying capacity of the inlet gas may be decreased by slightly cooling the gas. The present method accomplishes this objective by slightly warming the reversing passageway processing the purge gas stream during the first part of the purge gas stroke so as to increase the rate of impurity evaporatioin therein, and subsequently recooling such passageway during the last part of the purge stroke, thereby providing increased average temperature for the passageway during the complete purge stroke. During this same period, an alternate reversing passageway on an inlet gas stroke is cooled during the first part of the stroke and rewarmed during the last part to provide a lower average temperature during the inlet stroke. The recooling and the rewarming are necessary so that the reversing passageways are at the same temperature when the inlet and purge gas flows are switched. The heat transfer efficiency of the system is maintained at a relatively high level by keeping the overall warm gas flows in balance with the cold gas flows; while one reversing passageway is being warmed the other reversing passageway is being cooled.

According to the present invention, a low-boiling impurity-containing compressed gas stream is provided at an inlet pressure below 150 p.s.i.g. and passed during a gas cleanup stroke from the warm to the cold end of a first reversing passageway of a reversible heat exchange zone for cooling therein to a temperature below the deposition point of the low-boiling impurities thereby depositioning such impurities in the colder section of the passageway. As used herein the term "reversing pass" refers to a pass in which different gases flow in opposite directions during succeeding strokes. The term "non-reversing passes" as used herein refers to a pass wherein the same gas always flows through the pass even though its direction of flow may be reversed during succeeding strokes. A cold first fluid stream is provided at the cold end of such zone and passed through a first non-reversing passageway thermally associated with the first reversing passageway to cool the oppositely flowing inlet gas stream. Also, a cold purge gas stream is provided at the cold end of the reversible heat exchange zone and passed in opposite flow direction to the inlet gas stream as a purge gas stroke through a thermally separated second reversing passageway so as to evaporate impurities previously deposited therein by the inlet gas stream. The warm inlet gas and cold purge gas flows are periodically switched between the thermally separated first and second reversing passageways and the cold first fluid stream is switched between the first non-reversing passageway and a second non-reversing passageway thermally associated with the second reversing passageway. Thus, gas impurities are deposited from a cooling inlet gas stream in one reversing passageway during a gas cleanup stroke, and the inlet stream is switched to another reversing passageway for similar cooling and cleaning after the impurity concentration in the first reversing passageway has substantially increased by virtue of such deposition. The low-boiling impurities are reevaporated and swept out of the first reversing passageway by the cold purge gas stream which flows through the impurity-laden reversing passageway after the inlet gas flow has been switched therefrom. Impurity deposition is obtained by heat exchanging the inlet gas stream with the cold first fluid stream in the thermally associated non-reversing passageways and thus cooling such impurities below their saturation points.

The essence of the present invention is the step of reducing the temperature difference between the inlet gas and the purge gas in the colder section of the reversible heat exchange zone so as to achieve substantially complete removal of the previously deposited inlet gas impurities by the purge gas. This is accomplished by recycling at least part of the warmed first fluid stream emerging from the warm end of one of the non-reversing passageways to the warm end of another non-reversing passageway for passage therethrough in countercurrent heat exchange relation with the purge gas in the thermally associated reversing passageway. The relative flows of the recycling first fluid and the purge gas are adjusted so as to additionally warm the reversing passageway processing the purge gas slightly and increase the rate of impurity evaporation therein during the first part of the purge gas stroke. Subsequently the flows are readjusted to recool such reversing passageway and recool the purge gas stream to its normal temperature by the end of the purge stroke. In this manner, the reversing passageway processing the purge gas will be at the optimum temperature for switching of gas flows; that is, the same temperature as the reversing passageway processing the inlet gas stream.

The aforementioned relative flow adjustment may be obtained by, for example, increasing the recycling first fluid flow rate during the first part of the purge stroke and subsequently decreasing such flow rate for the remainder of such stroke, the purge gas flow rate remaining constant. The desired flow adjustment may also be achieved by decreasing the purge gas flow rate during the first part of the purge gas stroke and subsequently increasing such flow rate for the remainder of the purge gas stroke. As a further alternative, the recycling first fluid and purge gas flow rates may be respectively increased and decreased during the first part of the purge stroke and subsequently respectively decreased and increased for the remainder of the purge gas stroke. The adjustment of the first fluid flow has the added advantage of decreasing the temperature of the inlet gas in the alternate reversing passageway.

In the case of a low-temperature air separation system, carbon dioxide and the lighter weight hydrocarbons comprise the low-boiling impurities to be removed, and the cold cleaned air is conducted to a rectification column for separation into at least oxygen and nitrogen components. The latter may constitute the purge gas and first fluid used to cool and facilitate cleaning of the inlet air stream. For example, in the zone of carbon dioxide deposition, an increase of about 3° C. in the temperature of the purge gas will allow it to carry out about twice as much carbon dioxide from the reversing passageway. As one illustration, the oxygen component may serve as the purge gas while the nitrogen component may comprise the first fluid, the refrigeration of both air separation products being recovered by heat exchange with the cooling inlet air. Alternatively, the function of the air separation products may be reversed so that the oxygen gas serves as the first fluid, and at least part of the nitrogen gas is used as the purge gas. In either case, the first fluid is recovered in an uncontaminated state from the warm end of the reversible heat exchange zone and may constitute a product gas fraction. Although the invention will be described in detail with respect to a low-temperature air purification system, it is to be understood that it is equally applicable to other low-boiling impurity-containing gases such as crude hydrogen containing carbon dioxide.

One important advantage of this invention is in providing a method of reducing the required net quantity of purge gas to obtain the desired self-cleaning condition, thereby increasing the proportion of a cold first fluid that may be passed through the reversible heat exchange zone for refrigeration purposes and discharged as impurity-free product gas. For example in the case of an air separation system this invention permits an increase of clean product recovery from about 50% of the inlet air to 75% or above. Thus, it is possible to simultaneously produce substantial quantities of high purity nitrogen and high purity oxygen, and recover the refrigeration from such streams in the heat exchange zone without impurity contamination therein.

The phrase "reversible heat exchange zone" as used in the specification and claims includes both passage exchanging reversing heat exchangers of the type described in Trumpler U.S.P. 2,460,859, and cold accumulators as described in Fränkl U.S.P. 1,890,646. In the former the inlet air stream is cooled in a reversing passageway by heat exchange with a colder fluid flowing through an adjacent passageway, whereas in the latter the air stream flows through the cold accumulator packing as the reversing passageway. The packing acts as an intermediate storage means for refrigeration transferred thereto by the purge gas during the preceding purge gas stroke.

Another advantage of the present invention is that it may be practiced with the above-mentioned passage exchanging reversing heat exchangers. However, it is not practical to use the conventional three-pass units in which two separate but thermally associated reversing passageways or passes for the inlet gas and purge gas are provided in conjunction with a third non-reversing pass for cold product gas, the latter pass being thermally associated with the first two passes. This is because slight additional warming of the purge gas would also warm the inlet gas pass since the two passes are metal bonded together to form an excellent heat transfer path. Thus, the temperature difference between impurity deposition and evaporation would remain unchanged and the degree of self-cleaning would not be improved. Also if standard 3-pass units were used the quantity of impurities deposited in the cold end of the inlet gas pass would be decreased and the cooled inlet gas would retain an appreciable quantity of impurities. For these reasons it is necessary to thermally separate the reversing passageways through which the inlet gas and the purge gas flow.

Referring now to the drawings and particularly to FIG. 1, compressed inlet air at a pressure of less than about 150 p.s.i.g. passes through conduit 11 and warm end reversing valve 12 to the warm end of reversible heat exchange zone 13, and specifically reversing passageway 14 of heat exchanger 15. The inlet air stream is cooled therein to a temperature below the carbon dioxide deposition point, thereby depositing such impurity in the passageway. In the case of air, this temperature may be about −173° C. The inlet air in reversing passageway 14 is countercurrently cooled by cold nitrogen product gas separated from the cold, clean air in a rectifying column (not shown) and directed through conduit 16 at about −176° C. to the cold end of heat exchanger 15 for passage through non-reversing pass 17 which is thermally associated with reversing pass 14. The warmed uncontaminated product nitrogen gas is discharged from the warm end of this pass into conduit 18 and directed through warm end flow reversing valve 19 into conduit 19a for consumption or further processing as desired.

Meanwhile, the cooled and cleaned inlet air is discharged from the cold end of reversing pass 14 into conduit 20 and directed through cold end reversing valve 21 to the previously mentioned air rectification column for separation into air components. Cold oxygen gas from such column at about −176° C. enters conduit 22, passes through cold end reversing valve 21, and is conducted to the cold end of reversing passageway 23 of reversing heat exchanger 24 for flow therethrough as purge gas. The latter is simultaneously warmed and evaporates the carbon dioxide impurity previously deposited in reversing pass 23 during the gas cleanup stroke. The impurities are swept out of such pass by the purge gas which is discharged from the warm end into conduit 25 for passage through warm end reversing valve 12 and discharge to the atmosphere or further processed as desired.

To obtain the desired slight additional warming of the purge gas during the first portion of the purge gas stroke, a regulated part of the warmed clean nitrogen product gas is drawn from conduit 19a through conduit 26 by pump or blower 27 therein, passed through adjustable flow valve 28 and warm end reversing valve 19, and directed to the warm end of non-reversing passageway 29 as a warm recycling fluid. The latter mentioned pass forms part of reversing heat exchanger 24, and is thermally associated with reversing pass 23. The warm recycled product nitrogen entering non-reversing pass 29 at about 20° C. flows countercurrent to the cold purge oxygen gas entering reversing pass 23 at about −176° C. and consequently warms the latter. The recooled and recycled product nitrogen is discharged from the cold end of non-reversing pass 29 into conduit 30, and preferably rejoins the main product nitrogen stream in conduit 16 for circulation as previously described.

The recycling product nitrogen flow rate is varied by means of adjustable flow valve 28, and the operation of the present invention will be more easily understood by the following illustrative numerical example. Starting with 100 cu. ft. of inlet air, 75 cu. ft. nitrogen-rich product and 25 cu. ft. oxygen-rich product may be separated in the rectification column. If the gas cleanup and purge gas strokes are both assumed to be 5 minutes, the average product nitrogen recycle flow may be 25 cu. ft., and divided as follows: 30 cu. ft. during the first 2.5 minutes and 20 cu. ft. during the remaining 2.5 minutes of the purge gas stroke. Thus, during the first part of the latter stroke the warm recycling nitrogen gas flow through non-reversing pass 29 will be 5 cu. ft. more than the countercurrently flowing purge gas in reversing pass 23, the net effect being a slight reduction in the temperature difference between the purge gas and the inlet air stream in the colder section of reversing passes 23 and 14, respectively. That is, the unbalancing of the flows in reversing heat exchanger 24 additionally warms the purge gas slightly above its normal temperature in the carbon dioxide deposition zone, thereby decreasing the temperature difference between the air from which the carbon dioxide is deposited and the oxygen purge gas which reevaporates the carbon dioxide. The rate of carbon dioxide evaporation is thereby increased. The purge gas may, for example, be additionally warmed 2° C. above its normal temperature in the coldest part of the reversible heat exchange zone, but is to be understood that the degree of warmup is controllable at will, by varying the product gas recycle flow through valve 28. In the aforegoing example when the product nitrogen recycle is decreased to 20 cu. ft., the flows in reversing heat exchanger 24 are unbalanced in the opposite direction and the purge gas is cooled back to its normal temperature by the end of the stroke. Reducing the product gas recycle flow during the remaining part of the purge gas stroke is necessary to bring the reversing passageway temperatures back to their normal level for switching.

On completion of the previously described gas cleanup and purge gas strokes in reversing passes 14 and 23 respectively, the various flows are switched between reversing heat exchangers 15 and 24 by warm end reversing valves 12 and 19, and cold end reversing valve 21 which operate in a manner well-known to those skilled in the art. Thus, the inlet air stream is switched from reversing pass 14 to reversing pass 23 and the nitrogen purge gas is switched from reversing pass 23 to reversing pass 14. Also, the cold clean product nitrogen flow is switched from non-reversing pass 17 to non-reversing pass 29, and the warm recycling product nitrogen gas is switched from non-reversing pass 29 to non-reversing pass 17.

It is emphasized that the relative quantities in the foregoing example are illustrative and not necessarily the ratios that would be used in all plants. For example, in FIG. 1 it may be possible to purge with considerably less than 25 cu. ft. per 100 cu. ft. of inlet air. In this event, the product quantity would be correspondingly increased. Another variation is to use a relatively higher recycle for a relatively shorter portion of the purge stroke, e.g. 45 cu. ft. for the first quarter, 25 cu. ft. (normal) the next half, and 5 cu. ft. for the final quarter of the purge stroke. A further significant point to be noted is that for simplicity the illustrative flows indicate that 100 cu. ft. of air yields 25 cu. ft. of oxygen and 75 cu. ft. of nitrogen. This, of course, depends on the product purities, for air is composed of approximately 1% argon, 21% oxygen and 78% nitrogen.

Figure 2:
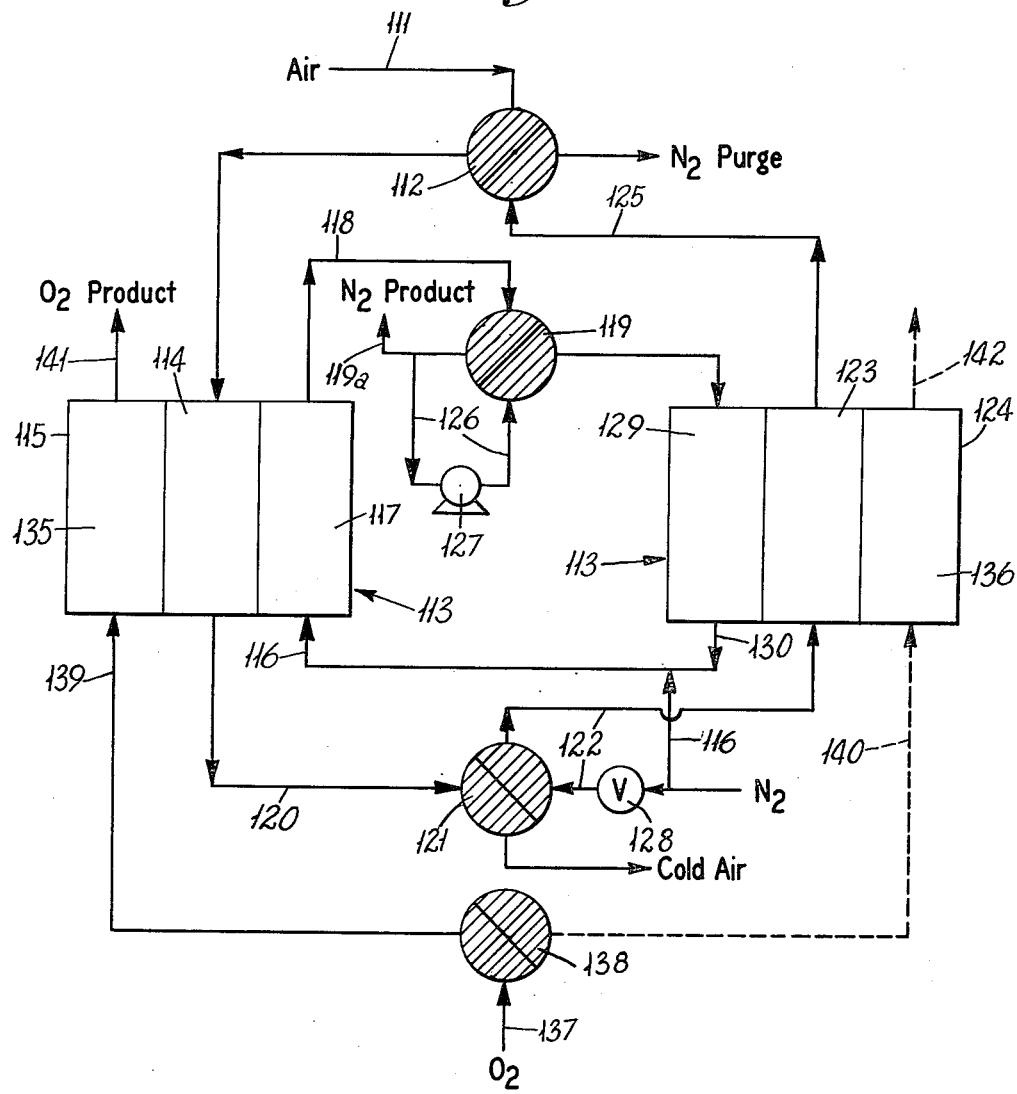
FIG. 2 is a schematic flow diagram of a low-temperature gas mixture cleanup system similar to FIG. 1, but modified so that the purge gas flow is variable.

FIG. 2 illustrates the flexibility of the present invention with respect to selection of clean products, and this embodiment has been arranged for maximum recovery of clean oxygen product and as much clean nitrogen product as possible. A third passageway has been added to each reversing heat exchanger, and cold product oxygen passes alternately therethrough in countercurrent heat exchange with the incoming air. The desired flow variation may be obtained by varying the recycled product gas flow rate as described previously. Alternatively, the purge gas flow rate may be varied.

Referring now more specifically to FIG. 2, the two reversing heat exchangers 115 and 124 each have a third switching passageway 135 and 136 which is thermally associated with the reversing passageways 114 and 123 respectively. The cold product oxygen separated in the rectification column enters the system through conduit 137 and is directed through cold end reversing valve 138 and either conduit 139 or 140 to the cold end of the reversing heat exchanger through which inlet air is passing. Thus, in FIG. 2 reversing heat exchanger 115 is on-stream and the cold product oxygen flows through switching pass 135 in countercurrent heat exchange relation with the inlet air in reversing pass 114. The warmed product oxygen is discharged from the warm end of pass 135 into conduit 141 for consumption or further processing as desired. It is to be noted that during this stroke, there is preferably no oxygen product flow through switching pass 136 of reversing heat exchanger 124.

The cold nitrogen gas from the air separation column enters the reversible heat exchange zone 113 through conduit 116 and most of this gas is directed through non-reversing pass 117, conduit 118, warm end flow reversing valve 119, and discharge conduit 119a as a clean product fraction. A constant portion of this warmed fraction is diverted from conduit 119a through conduit 126 for recycling through pump 127, warm end reversing valve 119 and non-reversing passageway 129 to warm the counter-currently flowing nitrogen purge gas in reversing pass 129. The recooled recycling product nitrogen gas is discharged into conduit 130 and joined with the main product nitrogen stream in conduit 116 for flow through non-reversing passageway 117 in the previously described manner. A minor part of the cold product nitrogen gas entering conduit 116 from the rectification column is diverted through conduit 122 and variable flow valve 128 therein for passage through cold end flow reversing valve 121 to the cold end of reversing heat exchanger 124 for flow through reversing pass 123 and evaporation of the deposited carbon dioxide therein. The warmed impurity-laden nitrogen stream discharged into conduit 125, and directed through warm end reversing valve 112 for discharge from the system. The purge gas flow is varied by means of variable flow valve 128 so as to reduce the temperature difference between the inlet air and the purge gas in the colder section of the reversible heat exchange zone 113. This is accomplished by decreasing the purge gas flow rate during the first part of the purge stroke, and subsequently increasing the purge gas flow rate for the remainder of the stroke.

Although this particular embodiment of the invention contemplates maintaining the clean product recycle at a constant flow rate during the purge gas stroke, it is to be understood that the desired flow variation between the recycling product gas and purge gas may be achieved by a combination of the methods illustrated in FIGS. 1 and 2. That is, the recycling product gas and purge gas flows may be respectively increased and decreased during the first part of the purge stroke and subsequently respectively decreased and increased for the remainder of such stroke.

Figure 3:
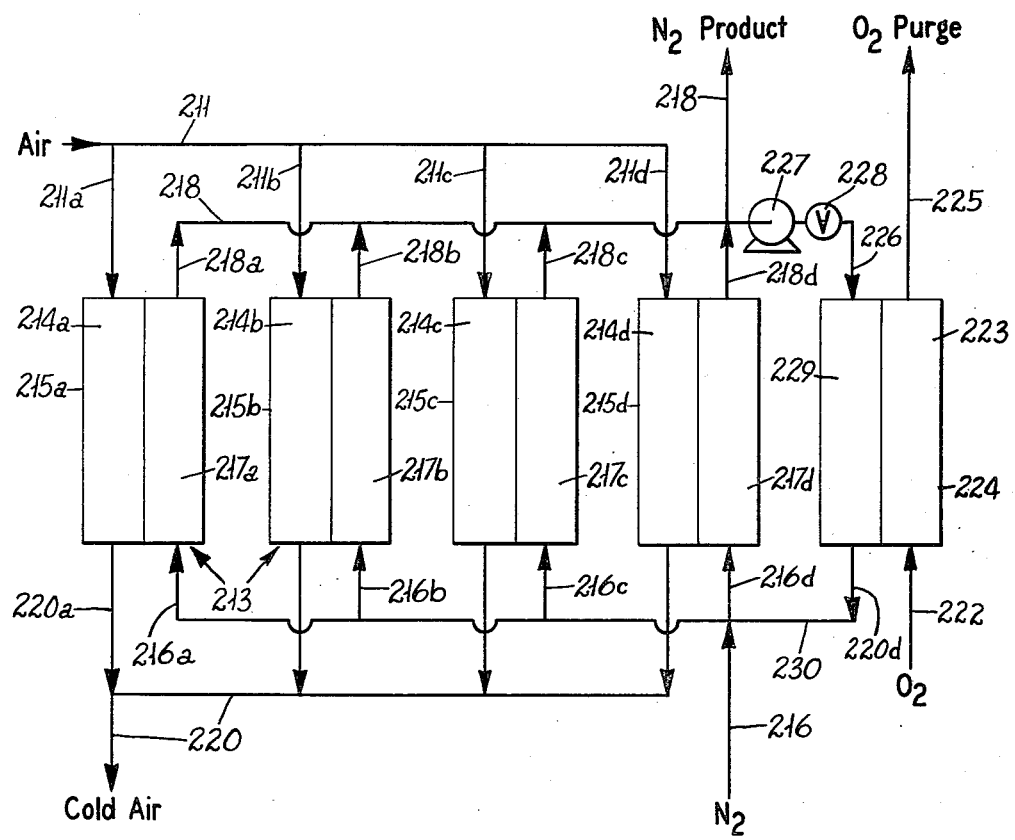
FIG. 3 shows a schematic flow diagram of another low-temperature gas mixture cleanup system according to the present invention, including several two-pass reversing heat exchangers and a variable flow, first fluid recycle system.

In the previously described embodiments of the invention only two heat exchangers were used, one being purged while the other is on-stream. The heat exchangers may be more effectively applied if a larger number of units are used. Referring now to FIG. 3, five reversing heat exchangers are piped in parallel and only one of the five is being purged at a given time. This particular arrangement is for maximum recovery of uncontaminated nitrogen product gas, oxygen providing the purge gas. Air enters the system through inlet manifold 211 and is directed to the two-pass reversing heat exchangers 215a–215d for countercurrent cooling and cleaning in reversing passageways 214a–214d against the product nitrogen gas in thermally associated non-reversing passageways 217a–217d. The cooled and clean inlet air is discharged from the reversing heat exchange zone 213 into discharge manifold 220 for passage to the air separation column. The fifth unit, reversing heat exchanger 224, is being purged during this period with cold oxygen purge gas entering the cold end of reversing passageway 223. Warmed product nitrogen gas is discharged from the warm end of non-reversing passageways 217a–217d into discharge conduit 218, a minor part of such warm gas being recycled through conduit 226, pump 227, and variable flow valve 228 to the warm end of reversing heat exchanger 224 for flow through non-reversing pass 229 in countercurrent heat exchange relation with the purge gas in thermally associated reversing pass 223. The product nitrogen recycle flow is varied by means of variable flow valve 228 in the same manner as described in conjunction with FIG. 1, so as to reduce the temperature difference between the inlet air and the purge gas in the colder section of reversible heat exchange zone 213. It is to be understood that the reversing heat exchangers 215a–215d and 224 are piped for consecutive purging, so that when the presently illustrated purge stroke is completed, reversing heat exchanger 215a will be placed on purge and reversing heat exchanger 224 will be placed on-stream. In the interest of simplicity, the piping and valving for this switching has not been illustrated, but will be fully understood by those skilled in the art.

Figure 4:
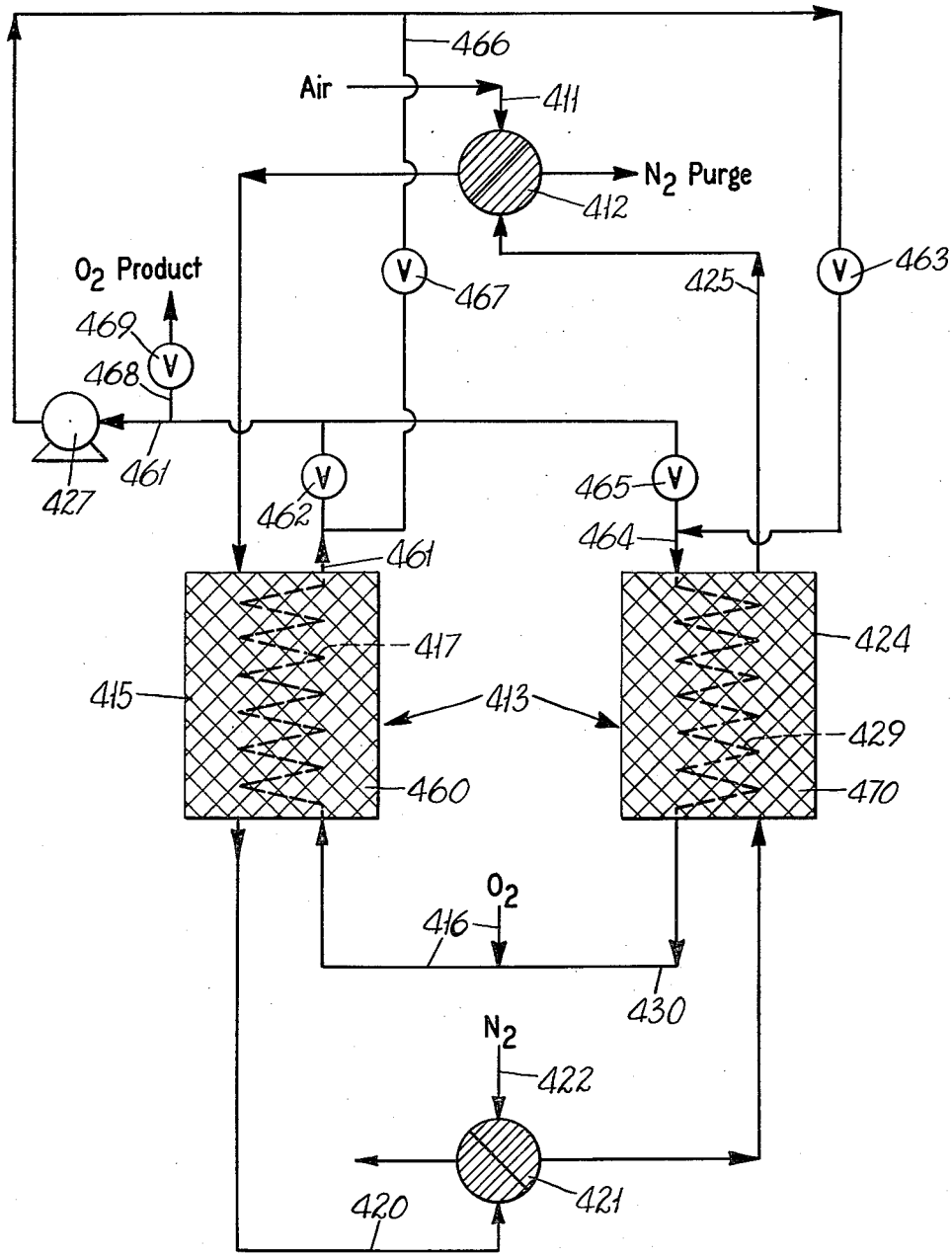
FIG. 4 is a schematic flow diagram of an additional low-temperature gas mixture cleanup system according to the invention, in which two cold accumulators constitute the reversible heat exchange zone.

FIG. 4 illustrates another embodiment of the invention in which two cold accumulators with embedded coils constitute the reversible heat exchange zone. Compressed inlet air enters cold accumulator 415 through conduit 411 and is cooled and consequently cleaned by passage around the cold accumulator packing 460, the latter acting as a storage means for the refrigeration transferred thereto during the previous purge gas stroke. The carbon dioxide is deposited from the air on packing in the colder section of the accumulator, and the cooled air is discharged therefrom into conduit 420 as a carbon dioxide-free gas. Meanwhile the other cold accumulator 424 is being cleaned and recooled by purge gas, e.g. nitrogen, supplied through conduit 422 and passed to the cold end of such accumulator for flow therethrough. The resulting carbon dioxide-laden warmed gas is discharged from the warm end thereof into conduit 425 for passage through warm end reversing valve 412 to the atmosphere or for further use as desired. At the start of the stroke, a first cold fluid enters the system through conduit 416 and is directed to the cold end of on-stream accumulator 415 for passage through coils 417 in countercurrent heat exchange with the inlet air flowing through the packing bed 460. Accumulator 415 is thereby additionally cooled and the bulk of the impurities from the air will be deposited somewhat nearer the warm end of the accumulator than would occur without the cold fluid flow. The warmed first gas is discharged into conduit 461 having control valve 462 therein, and at least part thereof may be directed to pump 427 for recycling through control valve 463 to conduit 464 at the warm end of cold accumulator 424 which is being purged. The warmed recycled first fluid is passed through embedded coils 429 countercurrent to the purge gas flowing through the packed bed 470, so as to slightly warm at least the colder section of such bed and increase the rate of carbon dioxide evaporation. The recooled first fluid is discharged from the cold end of embedded coil 429 into conduit 430 and passed therethrough to a junction with the main first cold fluid stream in conduit 416 for flow through the on-stream cold accumulator, as previously described. At an intermediate point of the stroke and preferably the midpoint, the warmed recycled first fluid flow through embedded coils 429 is terminated by closing control valve 463, and the cold first fluid is directed through conduit 430 to the cold end of accumulator 424 for passage through embedded coils 429 to the warm end thereof in a direction cocurrent to the purge gas flow. The resulting warmed first fluid is directed through conduit 464 and control valve 465 therein, and at least part thereof is recirculated through conduit 461 and pump 427 therein to conduit 466. The recirculated warm fluid is directed through conduit 466 and control valve 467 therein to the warm end of on-stream accumulator 415 for passage through embedded coils 417 in direction co-current with the inlet air flowing through the packing bed 460. The recooled first fluid is discharged from the cold end of embedded coils 417 into conduit 416 for further circulation as previously described. At the end of the stroke when the air and purge streams are switched, the first fluid flow continues as before until the midpoint of the stroke is reached. At this moment the first fluid flows are switched back to their initial position as indicated in the discussion above, i.e. with the first fluid flow from the cold to the warm end of coil 417 and from the warm to the cold end of coil 429. Although embedded coils 417 and 429 are illustrated as extending from the cold to the warm end of the accumulators, it is to be understood that such passages may be situated only in the colder section of the reversing heat exchange zone so that the circulating first fluid is discharged therefrom at an intermediate thermal level.

The first fluid and its recirculation rate should be selected so as not to adversely effect the normal function of the accumulators. For example, it should not warm the cold end of the air intake accumulator above about $-160°$ C. as this would seriously decrease the proportion of carbon dioxide deposited from the inlet air and thus permit passage of an appreciable amount of carbon dioxide to the rectification column.

The first fluid is preferably circulated continuously as previously described. It could, however, be circulated during only the first part of the purge stroke of each accumulator so as to minimize power costs. One further alternative would be to continuously circulate the first fluid, and provide a relatively higher circulation rate through the embedded coils of the purging accumulator during the first part as compared with the latter part of the purge stroke. The first cold fluid may, for example, be oxygen or nitrogen product gas separated from the air, in which case a major portion of the warmed product gas will be discharged from conduit 461 through conduit 468 and control valve 469 therein for consumption or further processing as desired. Alternatively the flow unbalancing system may be a closed circuit in which an externally supplied refrigerant, e.g. certain freons, is charged therein through conduit 416. Also, a conventional means of supplying flow unbalance in the reversible heat exchange zone may be provided in conjunction with the present invention to obtain best efficiency and economy. Such means may for example be the well-known side bleedoff from an intermediate thermal level of the heat exchange zone.

Although preferred embodiments of the invention have been described in detail, it is contemplated that further modifications of the process and apparatus may be made and that some features may be employed without others, all within the spirit and scope of the invention.

What is claimed is:

1. In a process for the low-temperature cleaning of a low-boiling impurity-containing compressed gas stream in which a gas stream is provided at an inlet pressure below 150 p.s.i.g. and passed during a gas cleanup stroke from the warm to the cold end of a first reversing passageway of a reversible heat exchange zone for cooling therein to a temperature below the deposition point of the low-boiling impurities thereby depositing such impurities in the colder section of the passageway, a first cold fluid is provided at the cold end of such zone and passed through a first non-reversing passageway thermally associated with said first reversing passageway, and a cold purge gas stream is provided at the cold end of the reversible heat exchange zone at substantially the same pressure as said first cold fluid and passed in opposite flow relation to the inlet gas stream as a purge gas stroke through a thermally separated second reversing passageway so as to evaporate impurities previously deposited therein by the inlet gas stream for removal from the heat exchange zone, the warm inlet gas and cold purge gas flows being periodically switched between the thermally separated first and second reversing passageways and the first cold fluid being simultaneously switched between the first non-reversing passageway and a second non-reversing passageway thermally associated with the second reversing passageway; the improvement comprising the step of reducing the temperature difference between said inlet gas and the purge gas in the colder section of the reversible heat exchange zone so as to achieve substantially complete removal of the previously deposited inlet gas impurities by the purge gas, by continuously recycling part of the warmed first fluid emerging from the warm end of one of the non-reversing passageways to the warm end of the other of said non-reversing passageways for passage therethrough in countercurrent heat exchange relation with the purge gas in the thermally associated reversing passageway, adjusting the relative flows of the recycling first fluid and purge gas so as to slightly additionally warm the reversing passageway processing the purge gas and increase the rate of impurity evaporation during the purge stroke and subsequently recool such passageway to its normal temperature by the end of the purge gas stroke so that the passageway is at the optimum temperature for switching of flows, and withdrawing the remainder of said warmed first fluid as an impurity-free product in such quantity as to constitute more than about 20% of the combined volume of the purge gas and first cold fluid streams.

2. A process according to claim 1 for the low-temperature cleaning of a low-boiling impurity-containing compressed gas stream, in which air comprises the inlet gas stream and separated air components comprise the purge gas and the first fluid.

3. A process according to claim 1 for the low-temperature cleaning of a low-boiling impurity-containing compressed gas stream, in which the relative flow adjustment is accomplished by increasing the recycling first fluid flow rate during the first part of the purge stroke and subsequently decreasing such flow rate for the remainder of the purge stroke.

4. A process according to claim 1 for the low-temperature cleaning of a low-boiling impurity-containing compressed gas stream, in which the relative flow adjustment is accomplished by decreasing the purge gas flow rate during the first part of the purge stroke and subsequently increasing such flow rate for the remainder of the purge stroke.

5. A process according to claim 1 for the low-temperature cleaning of a low-boiling impurity-containing compressed gas stream, in which the relative flow adjustment is accomplished by respectively increasing and decreasing the recycling first fluid and purge gas flow rates during the first part of the purge stroke and subsequently respectively decreasing and increasing the recycling first fluid and purge gas flow rates for the remainder of the purge stroke.

6. A process according to claim 1 for the low-temperature cleaning of a low-boiling impurity-containing compressed gas stream, in which the recycled and recooled part of the first fluid rejoins the main cold first fluid stream at the cold end of the reversible heat exchange zone for passage through a non-reversing passageway in countercurrent heat exchange with the cooling inlet gas stream.

References Cited in the file of this patent

UNITED STATES PATENTS

| | | |
|---|---|---|
| 2,534,478 | Roberts | Dec. 19, 1950 |
| 2,653,455 | Etienne | Sept. 29, 1953 |
| 2,663,167 | Collins | Dec. 22, 1953 |
| 2,956,410 | Palazzo et al. | Oct. 18, 1960 |

FOREIGN PATENTS

| | | |
|---|---|---|
| 1,137,819 | France | Jan. 21, 1957 |